(12) United States Patent
Marinelli, III et al.

(10) Patent No.: US 9,471,370 B2
(45) Date of Patent: Oct. 18, 2016

(54) SYSTEM AND METHOD FOR STACK-BASED BATCH EVALUATION OF PROGRAM INSTRUCTIONS

(71) Applicants: Eugene E. Marinelli, III, Palo Alto, CA (US); Yogy Namara, Palo Alto, CA (US)

(72) Inventors: Eugene E. Marinelli, III, Palo Alto, CA (US); Yogy Namara, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 83 days.

(21) Appl. No.: 13/657,656

(22) Filed: Oct. 22, 2012

(65) Prior Publication Data

US 2014/0115589 A1    Apr. 24, 2014

(51) Int. Cl.
*G06F 9/46* (2006.01)
*G06F 9/54* (2006.01)
*G06F 9/44* (2006.01)

(52) U.S. Cl.
CPC .............. *G06F 9/466* (2013.01); *G06F 9/4425* (2013.01); *G06F 9/547* (2013.01); *G06F 2209/541* (2013.01)

(58) Field of Classification Search
CPC .. G06F 9/547; G06F 9/466; G06F 2209/541; G06F 9/4425
USPC ........................................................ 718/101
See application file for complete search history.

(56) References Cited

U.S. PATENT DOCUMENTS

| | | |
|---|---|---|
| 5,418,950 A | 5/1995 | Li et al. |
| 5,428,737 A | 6/1995 | Li et al. |
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Xbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bingham |
| 5,911,138 A | 6/1999 | Li et al. |
| 5,918,225 A | 6/1999 | White et al. |
| 6,208,985 B1 | 3/2001 | Krehel |

(Continued)

FOREIGN PATENT DOCUMENTS

| | | |
|---|---|---|
| CA | 2828264 | 4/2014 |
| CA | 2829266 | 4/2014 |

(Continued)

OTHER PUBLICATIONS

Philip Lee Bogle "Reducing cross domain call overhead using batched futures" Massachusetts Institute of Technology; May 1994 See particularly section 5, pp. 59-69. Available from http://dspace.mit.edu/bitstream/handle/172 I. 1/32608/31281268.pdf?sequence-1.*

(Continued)

*Primary Examiner* — Meng An
*Assistant Examiner* — Willy W Huaracha
(74) *Attorney, Agent, or Firm* — Hickman Palermo Becker Bingham LLP (57) ABSTRACT

A batching module that inspects call stacks within a stack evaluator to identify current expressions that can be evaluated in batch with other expressions. If such expressions are identified, the corresponding stacks are blocked from further processing and a batch processing request for processing the expressions is transmitted to the application server. The application server processes the expressions in batch and generates a value for each of the expressions. The blocked stacks are then populated with the values for the expressions.

13 Claims, 8 Drawing Sheets

(56) References Cited

U.S. PATENT DOCUMENTS

| | | | |
|---|---|---|---|
| 6,236,994 B1 | 5/2001 | Swartz et al. | |
| 6,289,334 B1 | 9/2001 | Reiner et al. | |
| 6,311,181 B1 | 10/2001 | Lee et al. | |
| 6,321,274 B1 | 11/2001 | Shakib et al. | |
| 6,643,613 B2 | 11/2003 | McGee et al. | |
| 6,745,382 B1 | 6/2004 | Zothner | |
| 6,851,108 B1 | 2/2005 | Syme et al. | |
| 6,857,120 B1 | 2/2005 | Arnold et al. | |
| 6,877,137 B1 | 4/2005 | Rivette et al. | |
| 6,976,024 B1 | 12/2005 | Chavez et al. | |
| 7,028,223 B1 | 4/2006 | Kolawa et al. | |
| 7,085,890 B2 | 8/2006 | Kashyap | |
| 7,155,728 B1 | 12/2006 | Prabhu et al. | |
| 7,216,133 B2 | 5/2007 | Wu et al. | |
| 7,406,592 B1 | 7/2008 | Polyudov | |
| 7,519,589 B2 | 4/2009 | Charnock et al. | |
| 7,546,353 B2 | 6/2009 | Hesselink et al. | |
| 7,610,290 B2 | 10/2009 | Kruy et al. | |
| 7,627,489 B2 | 12/2009 | Schaeffer et al. | |
| 7,783,679 B2 | 8/2010 | Bley | |
| 7,853,573 B2 | 12/2010 | Warner et al. | |
| 7,877,421 B2 | 1/2011 | Berger et al. | |
| 7,908,521 B2 | 3/2011 | Sridharan et al. | |
| 7,979,424 B2 | 7/2011 | Dettinger et al. | |
| 8,073,857 B2 | 12/2011 | Sreekanth | |
| 8,103,962 B2 | 1/2012 | Embley et al. | |
| 8,417,715 B1 | 4/2013 | Bruckhaus et al. | |
| 8,429,194 B2 | 4/2013 | Aymeloglu et al. | |
| 8,433,702 B1 | 4/2013 | Carrino et al. | |
| 8,433,703 B1 | 4/2013 | Carrino et al. | |
| 8,499,287 B2 | 7/2013 | Shafi et al. | |
| 8,560,494 B1 | 10/2013 | Downing | |
| 8,639,552 B1 | 1/2014 | Chen et al. | |
| 8,799,867 B1 | 8/2014 | Peri-Glass et al. | |
| 8,909,597 B2 | 12/2014 | Aymeloglu et al. | |
| 8,924,429 B1 | 12/2014 | Fisher et al. | |
| 8,935,201 B1 | 1/2015 | Fisher et al. | |
| 9,031,981 B1 | 5/2015 | Potter et al. | |
| 9,105,000 B1 | 8/2015 | White et al. | |
| 9,292,388 B2 | 3/2016 | Fisher et al. | |
| 2002/0184111 A1 | 12/2002 | Swanson | |
| 2003/0004770 A1 | 1/2003 | Miller et al. | |
| 2003/0023620 A1 | 1/2003 | Trotta | |
| 2003/0105833 A1 | 6/2003 | Daniels | |
| 2003/0212670 A1* | 11/2003 | Yalamanchi | G06F 17/2241 |
| 2004/0088177 A1 | 5/2004 | Travis et al. | |
| 2004/0098731 A1 | 5/2004 | Demsey et al. | |
| 2004/0103088 A1 | 5/2004 | Cragun et al. | |
| 2004/0126840 A1 | 7/2004 | Cheng et al. | |
| 2004/0139212 A1 | 7/2004 | Mukherjee et al. | |
| 2004/0153837 A1 | 8/2004 | Preston et al. | |
| 2004/0193608 A1 | 9/2004 | Gollapudi et al. | |
| 2004/0254658 A1* | 12/2004 | Sherriff | G05B 19/41865 700/87 |
| 2005/0004911 A1 | 1/2005 | Goldberg et al. | |
| 2005/0021397 A1 | 1/2005 | Cui et al. | |
| 2005/0120080 A1 | 6/2005 | Weinreb et al. | |
| 2005/0183005 A1 | 8/2005 | Denoue et al. | |
| 2005/0226473 A1 | 10/2005 | Ramesh | |
| 2005/0278286 A1 | 12/2005 | Djugash et al. | |
| 2006/0004740 A1 | 1/2006 | Dettinger et al. | |
| 2006/0070046 A1 | 3/2006 | Balakrishnan et al. | |
| 2006/0074967 A1 | 4/2006 | Shaburov | |
| 2006/0080616 A1 | 4/2006 | Vogel et al. | |
| 2006/0116991 A1 | 6/2006 | Calderwood | |
| 2006/0129992 A1 | 6/2006 | Oberholtzer et al. | |
| 2006/0142949 A1 | 6/2006 | Helt | |
| 2006/0209085 A1 | 9/2006 | Wong et al. | |
| 2006/0271884 A1 | 11/2006 | Hurst | |
| 2006/0288046 A1 | 12/2006 | Gupta et al. | |
| 2007/0005582 A1 | 1/2007 | Navratil et al. | |
| 2007/0027851 A1 | 2/2007 | Kruy et al. | |
| 2007/0094248 A1 | 4/2007 | McVeigh et al. | |
| 2007/0113164 A1 | 5/2007 | Hansen et al. | |
| 2007/0150805 A1 | 6/2007 | Misovski | |
| 2007/0168336 A1 | 7/2007 | Ransil et al. | |
| 2007/0178501 A1 | 8/2007 | Rabinowitz et al. | |
| 2007/0192281 A1 | 8/2007 | Cradick et al. | |
| 2007/0260582 A1 | 11/2007 | Liang | |
| 2008/0126344 A1 | 5/2008 | Hoffman et al. | |
| 2008/0126951 A1 | 5/2008 | Sood et al. | |
| 2008/0155440 A1 | 6/2008 | Trevor et al. | |
| 2008/0196016 A1 | 8/2008 | Todd | |
| 2008/0201313 A1 | 8/2008 | Dettinger et al. | |
| 2008/0215543 A1 | 9/2008 | Huang et al. | |
| 2008/0267386 A1 | 10/2008 | Cooper | |
| 2009/0006150 A1 | 1/2009 | Prigge et al. | |
| 2009/0007056 A1 | 1/2009 | Prigge et al. | |
| 2009/0043762 A1 | 2/2009 | Shiverick et al. | |
| 2009/0055487 A1 | 2/2009 | Moraes et al. | |
| 2009/0083275 A1 | 3/2009 | Jacob et al. | |
| 2009/0094217 A1 | 4/2009 | Dettinger et al. | |
| 2009/0144747 A1 | 6/2009 | Baker | |
| 2009/0161147 A1 | 6/2009 | Klave | |
| 2009/0172674 A1* | 7/2009 | Bobak et al. | 718/101 |
| 2009/0187556 A1 | 7/2009 | Ross et al. | |
| 2009/0193012 A1 | 7/2009 | Williams | |
| 2009/0199047 A1 | 8/2009 | Vaitheeswaran et al. | |
| 2009/0248721 A1 | 10/2009 | Burton et al. | |
| 2009/0282068 A1 | 11/2009 | Shockro et al. | |
| 2009/0299830 A1 | 12/2009 | West et al. | |
| 2010/0011282 A1 | 1/2010 | Dollard et al. | |
| 2010/0073315 A1 | 3/2010 | Lee et al. | |
| 2010/0082671 A1 | 4/2010 | Li et al. | |
| 2010/0145902 A1 | 6/2010 | Boyan et al. | |
| 2010/0161646 A1 | 6/2010 | Ceballos et al. | |
| 2010/0169376 A1 | 7/2010 | Chu | |
| 2010/0169405 A1 | 7/2010 | Zhang | |
| 2010/0199167 A1 | 8/2010 | Uematsu et al. | |
| 2010/0313119 A1 | 12/2010 | Baldwin | |
| 2011/0035396 A1 | 2/2011 | Merz et al. | |
| 2011/0041084 A1 | 2/2011 | Karam | |
| 2011/0066497 A1 | 3/2011 | Gopinath et al. | |
| 2011/0074811 A1 | 3/2011 | Hanson et al. | |
| 2011/0093490 A1 | 4/2011 | Schindlauer et al. | |
| 2011/0131547 A1 | 6/2011 | Elaasar | |
| 2011/0145401 A1 | 6/2011 | Westlake | |
| 2011/0208822 A1 | 8/2011 | Rathod | |
| 2011/0252282 A1 | 10/2011 | Meek et al. | |
| 2011/0258216 A1 | 10/2011 | Supakkul et al. | |
| 2011/0270871 A1 | 11/2011 | He et al. | |
| 2011/0321008 A1 | 12/2011 | Jhoney et al. | |
| 2012/0078595 A1 | 3/2012 | Balandin et al. | |
| 2012/0102022 A1 | 4/2012 | Miranker et al. | |
| 2012/0159449 A1 | 6/2012 | Arnold et al. | |
| 2012/0173381 A1 | 7/2012 | Smith | |
| 2012/0174057 A1 | 7/2012 | Narendra et al. | |
| 2012/0188252 A1 | 7/2012 | Law | |
| 2012/0284719 A1* | 11/2012 | Phan et al. | 718/101 |
| 2013/0024268 A1 | 1/2013 | Manickavelu | |
| 2013/0024731 A1 | 1/2013 | Shochat et al. | |
| 2013/0054551 A1 | 2/2013 | Lange | |
| 2013/0086482 A1 | 4/2013 | Parsons | |
| 2013/0096968 A1 | 4/2013 | Van Pelt et al. | |
| 2013/0198624 A1 | 8/2013 | Aymeloglu et al. | |
| 2013/0225212 A1 | 8/2013 | Khan | |
| 2013/0226944 A1 | 8/2013 | Baid et al. | |
| 2013/0232220 A1 | 9/2013 | Sampson | |
| 2014/0012886 A1 | 1/2014 | Downing et al. | |
| 2014/0074888 A1 | 3/2014 | Potter et al. | |
| 2014/0108074 A1 | 4/2014 | Miller et al. | |
| 2014/0115589 A1 | 4/2014 | Marinelli, III et al. | |
| 2014/0115610 A1* | 4/2014 | Marinelli et al. | 719/330 |
| 2014/0214579 A1 | 7/2014 | Shen et al. | |
| 2014/0244388 A1 | 8/2014 | Manouchehri et al. | |
| 2015/0112641 A1 | 4/2015 | Faraj | |
| 2015/0269030 A1 | 9/2015 | Fisher et al. | |
| 2016/0026923 A1 | 1/2016 | Erenrich et al. | |

FOREIGN PATENT DOCUMENTS

| | | |
|---|---|---|
| DE | 102014103482 | 9/2014 |
| EP | 1647908 | 4/2006 |
| EP | 2634745 | 9/2013 |

(56) References Cited

FOREIGN PATENT DOCUMENTS

| | | |
|---|---|---|
| EP | 2743839 | 6/2014 |
| EP | 2778986 | 9/2014 |
| EP | 2921975 | 9/2015 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 00/34895 | 6/2000 |
| WO | WO 2010/030917 | 3/2010 |
| WO | WO 2013/030595 | 3/2013 |

OTHER PUBLICATIONS

Wikipedia, "Machine Code" p. 1-5.*
Stamos et al. "Remote Evaluation", Journal ACM Transactions on Programming Languages and Systems (TOPLAS) vol. 12 Issue 4, Oct. 1990 pp. 537-564.*
New Zealand Intellectual Property Office, "First Examination Report" in application No. P089467NZ:RMM, dated Oct. 9, 2013, 2 pages.
Current Claims in application No. P089467NZ:RMM, dated Oct. 2013, 14 pages.
New Zealand Intellectual Property Office, "First Examination Report" in application No. P090010NZ:RM, dated Oct. 9, 2013, 1 page.
Current Claims in application No. P090010NZ:RM, dated Oct. 2013, 4 pages.
U.S. Appl. No. 13/608,864, filed Sep. 10, 2012, First Interview Office Action, Mar. 17, 2015.
U.S. Appl. No. 13/657,656, filed Oct. 22, 2012, Office Action, Oct. 4, 2014.
U.S. Appl. No. 13/728,879, filed Dec. 27, 2012, Office Action, Mar. 17, 2015.
U.S. Appl. No. 13/827,627, filed Mar. 14, 2013, Office Action, Mar. 2, 2015.
U.S. Appl. No. 13/831,791, filed Mar. 15, 2013, Office Action, Mar. 4, 2015.
U.S. Appl. No. 14/254,757, filed Apr. 16, 2014, Notice of Allowance, Sep. 10, 2014.
U.S. Appl. No. 14/254,773, filed Apr. 16, 2014, Notice of Allowance, Aug. 20, 2014.
U.S. Appl. No. 14/304,741, filed Jun. 13, 2014, Final Office Action, Mar. 3, 2014.
U.S. Appl. No. 14/304,741, filed Jun. 13, 2014, Office Action, Aug. 6, 2014.
U.S. Appl. No. 14/304,741, filed Jun. 13, 2014, Notice of Allowance, Apr. 7, 2015.
"A Quick Guide to UniProtKB Swiss-Prot & TrEMBL," Sep. 2011, pp. 2.
"A Tour of Pinboard," <http://pinboard.in/tour> as printed May 15, 2014 in 6 pages.
Bae et al., "Partitioning Algorithms for the Computation of Average Iceberg Queries," DaWaK 2000, LNCS 1874, pp. 276-286.
Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.

Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
"Frequently Asked Questions about Office Binder 97," http://web.archive.org/web/20100210112922/http://support.microsoft.com/kb/843147 printed Dec. 18, 2006 in 5 pages.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the $35^{th}$Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
Kahan et al., "Annotea: an Open RDF Infastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51-55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The Blast Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Russell et al., "Nitelight: A Graphical Tool for Semantic Query Construction," 2008, pp. 10.
Sigrist, et al., "Prosite, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008), Acitrezza, Catania, Italy, Sep. 29-Oct. 3, 2008, pp. 16.
"The FASTA Program Package," fasta-36.3.4, Mar. 25, 2011, pp. 29.
Notice of Acceptance for New Zealand Patent Application No. 622485 dated Nov. 24, 2014.
Notice of Acceptance for New Zealand Patent Application No. 616212 dated Jan. 23, 2015.
Official Communication for European Patent Application No. 14159175.0 dated Jul. 17, 2014.
Official Communication for European Patent Application No. 14159629.6 dated Jul. 31, 2014.
Official Communication for European Patent Application No. 14159629.6 dated Sep. 22, 2014.
Official Communication for New Zealand Patent Application No. 622414 dated Mar. 24, 2014.
Official Communication for New Zealand Patent Application No. 622484 dated Apr. 2, 2014.
Official Communication for New Zealand Patent Application No. 622485 dated Nov. 21, 2014.
Official Communication for Great Britain Patent Application No. 1404574.4 dated Dec. 18, 2014.
Official Communication for New Zealand Patent Application No. 616299 dated Jan. 26, 2015.

(56) References Cited

OTHER PUBLICATIONS

Official Communication for Canadian Patent Application No. 2807899 dated Oct. 24, 2014.
Official Communication for Australian Patent Application No. 2013237658 dated Feb. 2, 2015.
Official Communication for Australian Patent Application No. 2013237710 dated Jan. 16, 2015.
Official Communication for Australian Patent Application No. 2014201580 dated Feb. 27, 2015.
Official Communication for New Zealand Patent Application No. P090010NZ:RMN dated Jan. 26, 2015.
Claims for Australian Patent Application No. 2013237658 dated Feb. 2015, 4 pages.
Claims for Australian Patent Application No. 2013237710 dated Jan. 2015, 4 pages.
Claims for New Zealand Patent Application No. P090010NZ:RMN dated Jan. 2015, 4 pages.
Ballesteros et al., "Batching: A Design Pattern for Efficient and Flexible Client/Server Interaction," Transactions on Pattern Languages of Programming, Springer Berlin Heildeberg, 2009, pp. 48-66.
Bogle et al., "Reducing Cross-Domain Call Overhead Using Batched Futures," SIGPLAN No. 29, 10 (Oct. 1994) pp. 341-354.
Notice of Acceptance for New Zealand Patent Application No. 616299 dated Apr. 7, 2015.
Official Communication for German Patent Application No. 10 2013 221 057.4 dated Mar. 23, 2015.
Official Communication for German Patent Application No. 10 2013 221 052.3 dated Mar. 24, 2015.
Official Communication for Canadian Patent Application No. 2829266 dated Apr. 28, 2015.
Official Communication for Canadian Patent Application No. 2828264 dated Apr. 28, 2015.
Claims in Canadian Application No. 2,829,266, dated Apr. 2015, 4 pages.
Official Communication for European Patent Application No. 15159520.4 dated Jul. 15, 2015.
Official Communication for European Patent Application No. 14159175.0 dated Feb. 4, 2016.
Canadian Intellectual Property Office, "Search Report" in application No. 2,829,266, dated Apr. 1, 2016, 4 pages.
Canadian Claims in application No. 2,829,266, dated Apr. 2016, 5 pages.
Alur et al., "Chapter 2: IBM InfoSphere DataStage Stages," IBM InfoSphere DataStage Data Flow and Job Design, Jul. 1, 2008, pp. 35-137.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.
Goldstein et al., "Stacks Lazy Threads: Implementing a Fast Parallel Call," Journal of Parallel and Distributed Computing, Jan. 1, 1996, pp. 5-20.
Jenks et al., "Nomadic Threads: A Migrating Multithreaded Approach to Remote Memory Accesses in Multiprocessors," Parallel Architectures and Compilation Techniques, Oct. 20, 1996, pp. 2-11.
Wollrath et al., "A Distributed Object Model for the Java System," Proceedings of the $2^{nd}$ Conference on USENEX, Conference on Object-Oriented Technologies (COOTS), Jun. 17, 1996, pp. 219-231.
Official Communication for Canadian Patent Application No. 2807899 dated Jul. 20, 2015.
Official Communication for Netherlands Patent Application No. 2011613 dated Aug. 13, 2015.
Official Communication for Netherlands Patent Application No. 2011627 dated Aug. 14, 2015.
Official Communication for Netherlands Patent Application No. 2012437 dated Sep. 18, 2015.
Official Communication for European Patent Application No. 13157474.1 dated Oct. 30, 2015.
U.S. Appl. No. 13/608,864, filed Sep. 10, 2012, Final Office Action, Jun. 8, 2015.
U.S. Appl. No. 13/608,864, filed Sep. 10, 2012, Office Action Interview, Mar. 17, 2015.
U.S. Appl. No. 13/657,635, filed Oct. 22, 2012, Office Action, Mar. 30, 2015.
U.S. Appl. No. 13/767,779, filed Feb. 14, 2013, Notice of Allowance, Mar. 17, 2015.
U.S. Appl. No. 14/304,741, filed Jun. 13, 2014, Final Office Action, Mar. 3, 2015.
U.S. Appl. No. 14/304,741, filed Jun. 13, 2014, Pre Interview Communication, Aug. 6, 2014.
Official Communication for Canadian Patent Application No. 2,828,264 dated Apr. 11, 2016.
Claims for Canadian Patent Application No. 2,828,264, dated Apr. 2016, 4 pages.

\* cited by examiner

SYSTEM AND METHOD FOR STACK-BASED BATCH EVALUATION OF PROGRAM INSTRUCTIONS

BACKGROUND OF THE INVENTION

1. Field of the Invention

The present disclosure relates generally to data access and analysis and, more specifically, to a system and method for evaluating programs in batch.

2. Description of the Related Art

Software applications, such as financial analysis applications, allow users to create and interact with large software data objects. Such data objects organize data relevant to the software application and provide methods that allow operations to be performed on the data. In some situations, the operations are performed on a large set of data and require high processing power as well as high bandwidth access to a database.

Typically, for the efficient processing of such operations, the bulk of the processing occurs on a server that is external to the computing device that executes the software application. In operation, the software application transmits calls associated with the operations to be performed on the data, and the calls are processed on the server. The results of the processing are then transmitted back to the software application for presentation to the user.

One drawback to such an implementation is that the server receives and processes one call per operation to be performed. In situations where operations are performed on an extremely large set of data, serving a large amount of calls can slow down the server and, in some cases, crash the server. Such a scenario is extremely undesirable because the server is extremely slow and in some cases entirely unusable, thereby affecting the overall user experience.

As the foregoing illustrates, what is needed in the art is a mechanism for efficiently managing and processing a large volume of calls to be processed on a server.

SUMMARY OF THE INVENTION

One embodiment of the invention is computer-implemented method for evaluating a program instruction within the stack evaluator. The method includes the steps of generating a call frame associated with the program instruction within a call stack, wherein the call frame includes a first expression specified by the program instruction, generating a child frame associated with the first expression within the call stack, receiving a modification to the child frame that sets the value of the first expression within the child frame, and processing the call frame based at least in part on the value of the first expression within the child frame.

Advantageously, because a single batch processing request is transmitted to the application server for a group of similar expressions, the number of processing requests received by the application server is reduced. As a result, the application server is not burdened with a large amount of requests at any given time. Therefore, the overall processing efficiency of the application server is increased and the overall processing latency of the application server is reduced.

BRIEF DESCRIPTION OF THE FIGURES

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Figure 1:
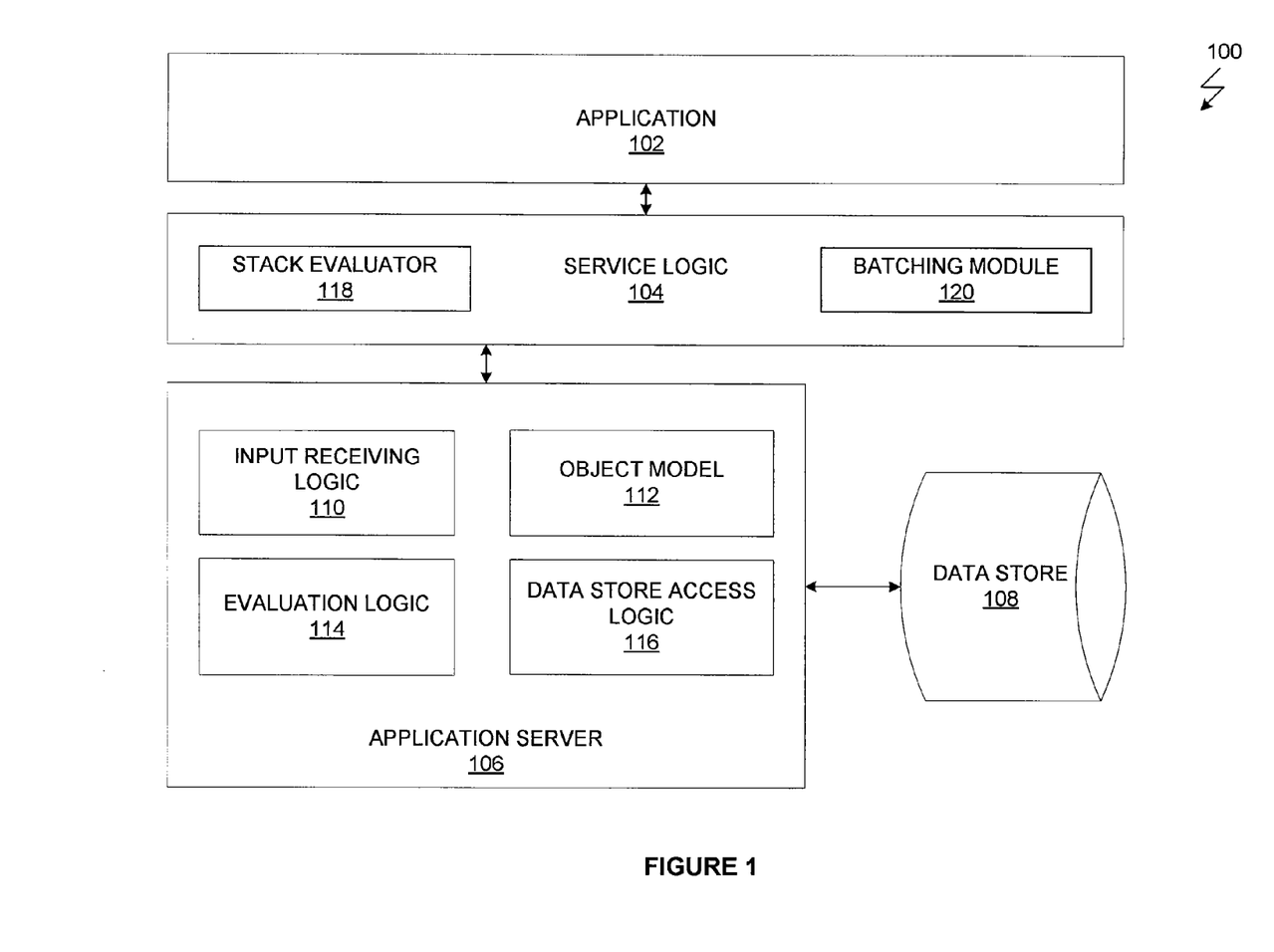
FIG. 1 illustrates a system that enables an application to be processed in batch-mode, according to one embodiment of the invention.

FIG. 1 illustrates a system 100 that enables an application to be processed in batch-mode. As shown, the system 100 includes a application 102, service logic 104, an application server 106 and a data store 108.

The application 102 is a software program that allows a user to create, analyze and interact with workflows having one or more documents. A document is typically composed of several data objects, each having a particular type and function. The data objects that could make up a document are described in greater detail below. A user, via a programming interface, can typically write program routines that interact with the data objects to generate the results or analysis needed. Again, some examples of such instructions are described below.

The service logic 104 is an infrastructure layer that, among other things, allows the application 102 to communicate with the application server 106. In one embodiment, the service logic 104 includes a messaging service (not shown) that allows the application 102 and the application server 106 to communicate asynchronously via messages. The service logic 104 includes a stack evaluator 118 and a batching module 120. The stack evaluator 118 is an infrastructure module that manages the stack-based evaluation of program routines associated with the application 102. Each program routine is associated with a call stack that includes multiple frames, each frame storing information about a particular portion of the program routine. The batching module 120 allows for the batch processing on the application server 106 of program routines being evaluated within the stack evaluator 118. The functions of the stack evaluator 118 and the batching module 120 is described in greater detail below in conjunction with FIGS. 2A-6B.

The application server 106 includes logical elements such as input receiving logic 110, an object model 112, evaluation logic 114 and data store access logic 116. The application server 106 may be implemented as a special-purpose computer system having the logical elements shown in FIG. 1. In one embodiment, the logical elements comprise program instructions stored on one or more machine-readable storage media. Alternatively, the logical elements may be implemented in hardware, firmware, or a combination thereof.

The input receiving logic 110 receives inputs from different applications executing within the system 100, such as the application 102, via the service logic 104. Inputs include, but are not limited to, processing requests, data access/storage requests and expression evaluation requests. The input receiving logic 110 transmits requests received from the different applications to logical elements within the application server 106 that are configured to process those requests.

The object model 112 is a model that specifies a universe of data objects, relationships between the data objects, higher-order data objects generated based on one or more zero-order data objects in the universe, higher-order data objects generated based on other higher-order data objects, and auxiliary entities related to the universe of data objects. The data objects may be created by users via data object creation mechanisms exposed in different applications, such as the application 102. In one embodiment, the object model 112 includes only references to the data objects and data related to those data objects is stored within the data store 108. Persons skilled in the art would understand that any other data objects can be included in the object model 112.

The evaluation logic 114 receives expression evaluation requests from applications, such as the application 102, via the input receiving logic and evaluates the expressions specified in those requests. An expression typically includes a reference to one or more data objects included in the object model 112 and specifies one or more operations to be performed on those data objects. The evaluation logic 114, when processing a particular expression, may create, modify, delete and store data objects that are associated with the universe of data objects included in the object model 112. In addition, the evaluation logic 112 transmits the results of processing the particular expression to the application that transmitted the expression evaluation request.

In an embodiment, application server 106 comprises data store access logic 116. Data store access logic 116 may comprise a set of program instructions which, when executed by one or more processors, are operable to access and retrieve data from data store 108. For example, data store access logic 116 may be a database client or an Open Database Connectivity (ODBC) client that supports calls to a database server that manages data store 108. Data store 108 may be any type of structured storage for storing data including, but not limited to, relational or object-oriented databases, data warehouses, directories, data files, and any other structured data storage.

Figure 2A:
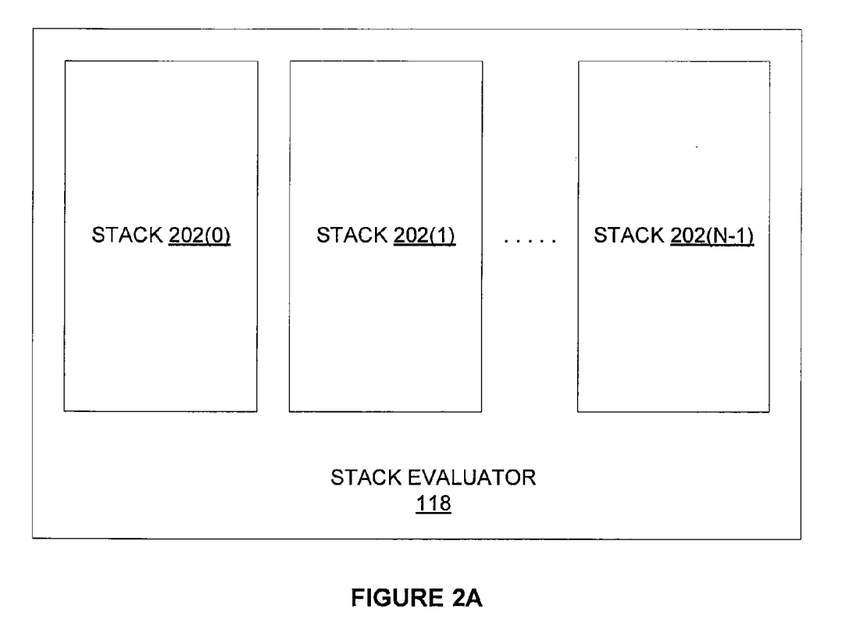
FIG. 2A illustrates a more detailed view of the stack evaluator of FIG. 1, according to one embodiment of the invention.

FIG. 2A illustrates a more detailed view of the stack evaluator 118 of FIG. 1, according to one embodiment of the invention. As shown, the stack evaluator 118 includes multiple stacks 202.

The stack evaluator 118 generates a stack 202 corresponding to each program subroutine (referred to herein as a "subroutine") associated with the application 102. Typically, a subroutine includes multiple instructions, where each instruction includes one or more expressions to be evaluated. As discussed above, an expression may include an argument, a parameter and/or a metric, as described above. When evaluating a particular instruction, the stack evaluator 118 generates a different frame for each expression within that instruction. For example, an array frame is generated for each argument of an instruction and a call frame is generated for performing a specified operation on the arguments that were evaluated in the array frame(s).

Figure 2B:
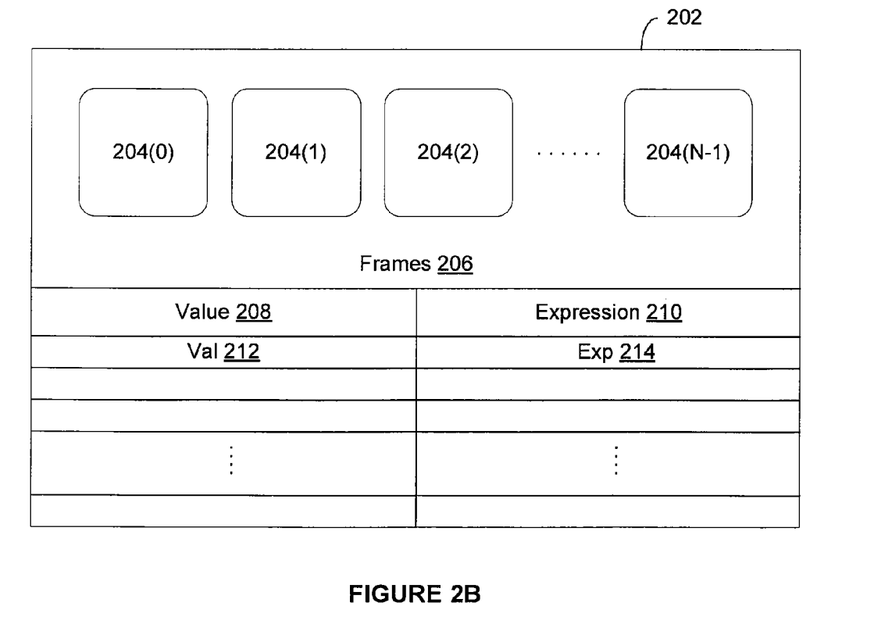
FIG. 2B illustrates a more detailed view of the stack of FIG. 2A, according to one embodiment of the invention.

FIG. 2B illustrates a more detailed view of a stack 202 of FIG. 2A, according to one embodiment of the invention. As shown, the stack 202 includes a frames portion 206, a value portion 208 and an expression portion 210.

The frames portion 206 includes multiple frames 204, where each frame 204 corresponds to a particular evaluation iteration of the subroutine corresponding to the stack 202. When a particular frame is ready for evaluation, the stack 202 transitions to an "evaluation state." During evaluation, the expressions within the current frame are first extracted and pushed into the expression array 210, such as exp 214. The value of the expressions are then evaluated and pushed into the value array 208. If an expression being evaluated is nested, the evaluation of the expression in the current frame 204 generates one or more new frames 204 that are evaluated before evaluating the current frame. Once the evaluation of each frame in the stack 202 is completed, the stack 202 transitions to a "completed state."

Figure 3:
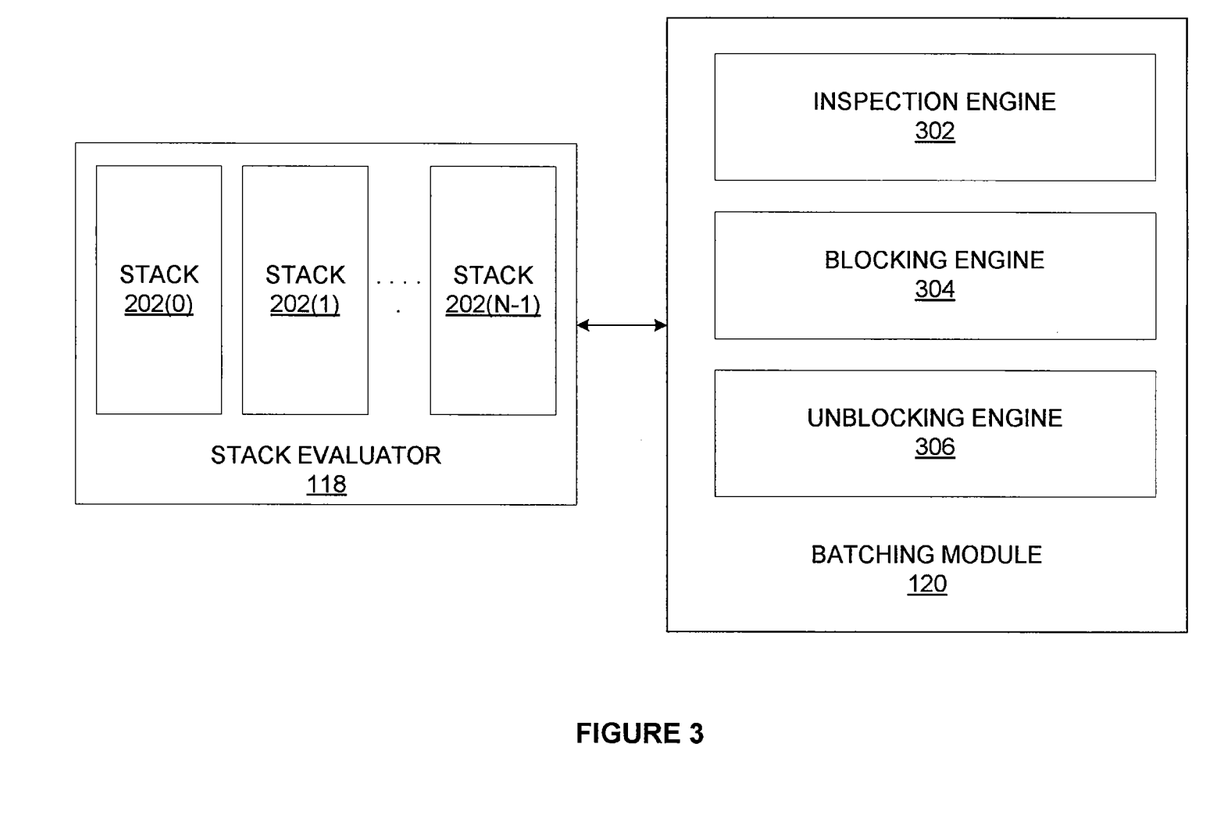
FIG. 3 illustrates a more detailed view of the batching module of FIG. 1, according to one embodiment of the invention.

FIG. 3 illustrates a more detailed view of the batching module 120 of FIG. 1, according to one embodiment of the invention. As shown, the batching module 120 includes an inspection engine 302, a blocking engine 304 and an unblocking engine.

The batching module 120 monitors the execution of program subroutines within the stack evaluator 118 to identify program subroutines that can be processed within the application server 106 in batch. More specifically, for each stack 202, the inspection engine 302 analyzes a current expression within a frame 204 of the stack 202 to determine whether the evaluation of the expression should be evaluated in batch with other similar expressions.

To determine whether a particular expression should be evaluated in batch with other similar expressions, the inspection engine 302 first determines the type of the expression. An expression may be an economic index, an instrument, a metric, an input object, an output object, a parameter, a time series, a higher-order-object, or any higher-order object in the object model. Based on the type of expression, the inspection engine 302 then determines whether the type of the expression falls within a predetermined category of expressions that should be processed in batch with other expressions of the same type or a similar type. For example, an expression that includes a metric for which the evaluation involves a database access or a model access should be processed in batch with other expressions that include metrics for which the evaluation involves database accesses or model accesses.

As another example, consider the following program instruction: return this.close+this.open, where "this" refers to a time series. There are multiple expressions within the program instruction, such as "this.close," "+," and "this.open." In one scenario, the program instruction may be evaluated multiple times, each evaluation generating a different stack 202. In such a scenario, the inspection engine 302 may identify the expressions "this.close" and "this.open" as expressions that should be evaluated in batch with similar expressions. Therefore, for each stack 202, the corresponding "this.close" expression is evaluated in batch with the "this.close" expressions in the remaining stacks 202. Similarly, for each stack 202, the corresponding "this.open" expression is evaluated in batch with the "this.open" expressions in the remaining stacks 202.

For a particular stack 202, once the inspection engine 302 determines that the current expression should be evaluated in batch with other similar expressions, the blocking engine 304 blocks the processing of the current expression and the stack 202, in general. At this instant, the stack 202 transitions to a "blocked state." Therefore, at any given point, a stack 202 is either in an evaluation state, a blocked state or a completed state. When all the stacks 202 are either in a blocked state or a completed state, the blocking engine 304 prepares the current expressions in each of the blocked stacks 202 (referred to herein as the "blocked expressions") for evaluation on the application server 106 in batch. The blocking engine 304 divides the blocked expressions into partitions, where blocked expressions in a particular partition are each associated with at least one similar characteristic. For example, each blocked expression in a particular partition may need a database call to be executed by the application server 106.

Once the blocked expressions are divided into partitions, the blocking engine 304 dispatches, per partition, a single call to the application server 106 for evaluating all of the expressions in that partition. The application server 106 evaluates the expression in a manner described above in conjunction with FIG. 1. The application server 106 transmits the results associated with each expression in a partition to the unblocking engine 306. For each result associated with a particular expression, the unblocking engine 306 updates the stack 202 corresponding to the expression to store the result. The updated stack 202 is then unblocked and the frames 204 within the stack 202 continue to be processed.

The inspection engine 302 continues to inspect the stacks 202 to identify expressions that can be evaluated in batch. In turn, the blocking engine 304 continues to block stacks 202 and dispatch calls for evaluating similar expressions in batch until each of the stacks 202 is in a completed state. In such a manner, similar expressions from different stacks 202 are processed in batch within the application server 106, thus increasing the efficiency of the overall system.

Figure 4:
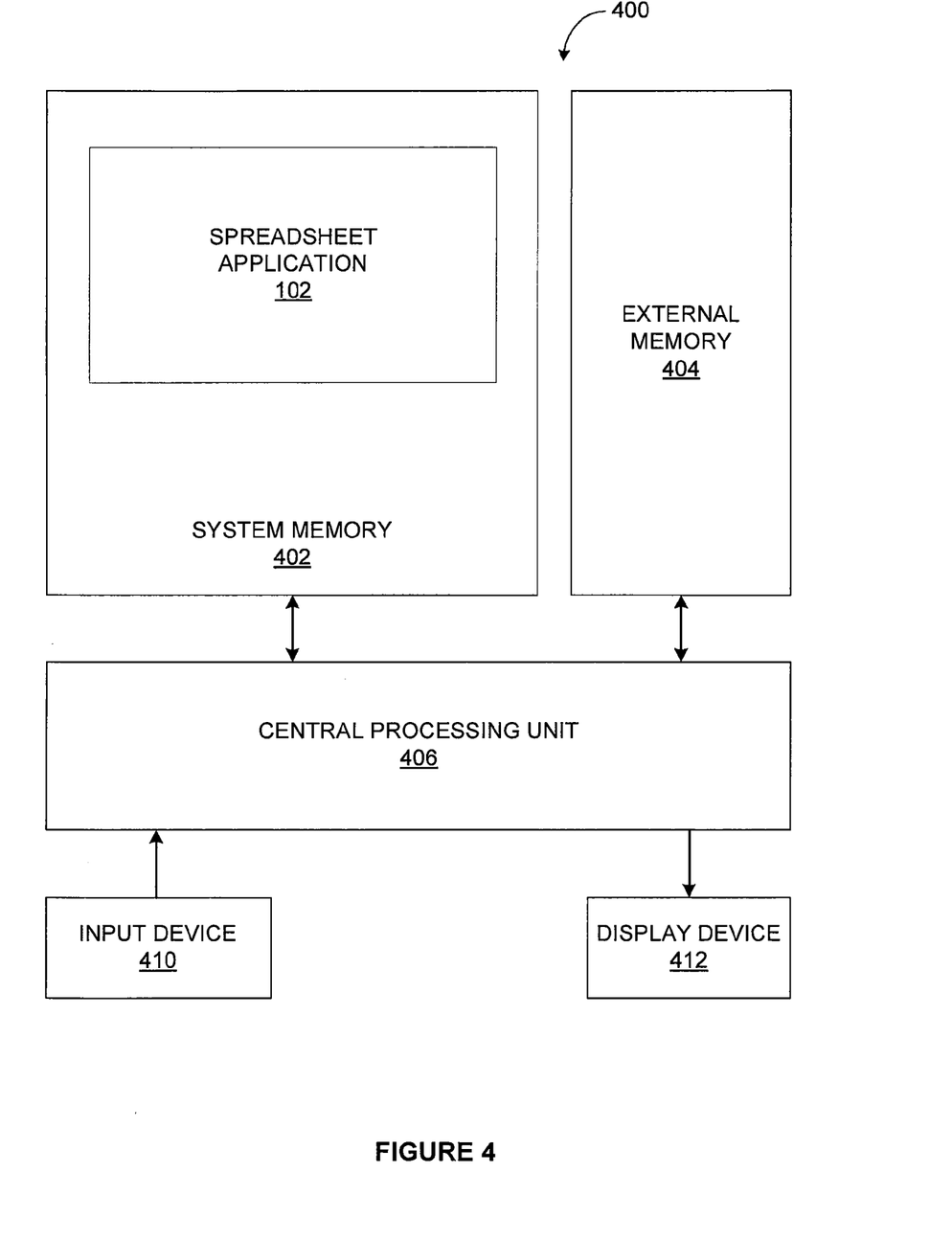
FIG. 4 is an exemplary system within which the application of FIG. 1 could execute, according to one embodiment of the invention.

FIG. 4 is an exemplary system within which the application 102 of FIG. 1 could execute, according to one embodiment of the invention. As shown, the system 400 includes a system memory 402, an external memory 404, a central processing unit (CPU) 406, an input device 410 and an display device 412.

The system memory 402 includes the application 102 previously described herein. The system memory 402 is a memory space, usually a random access memory (RAM), that temporarily stores software programs running within the system 400 at any given time. The CPU 406 executes a sequence of stored instructions associated with and/or transmitted from the various elements in the computer system 400. The external memory 404 is a storage device, e.g. a hard disk, for storing data associated with the application 102. The input device 410 is an end-user controlled input device, e.g. a mouse or keyboard, that allows a user to manipulate various aspects of the application 102. The display device 412 may be a cathode-ray tube (CRT), a liquid crystal display (LCD) or any other type of display device.

Figure 5A:
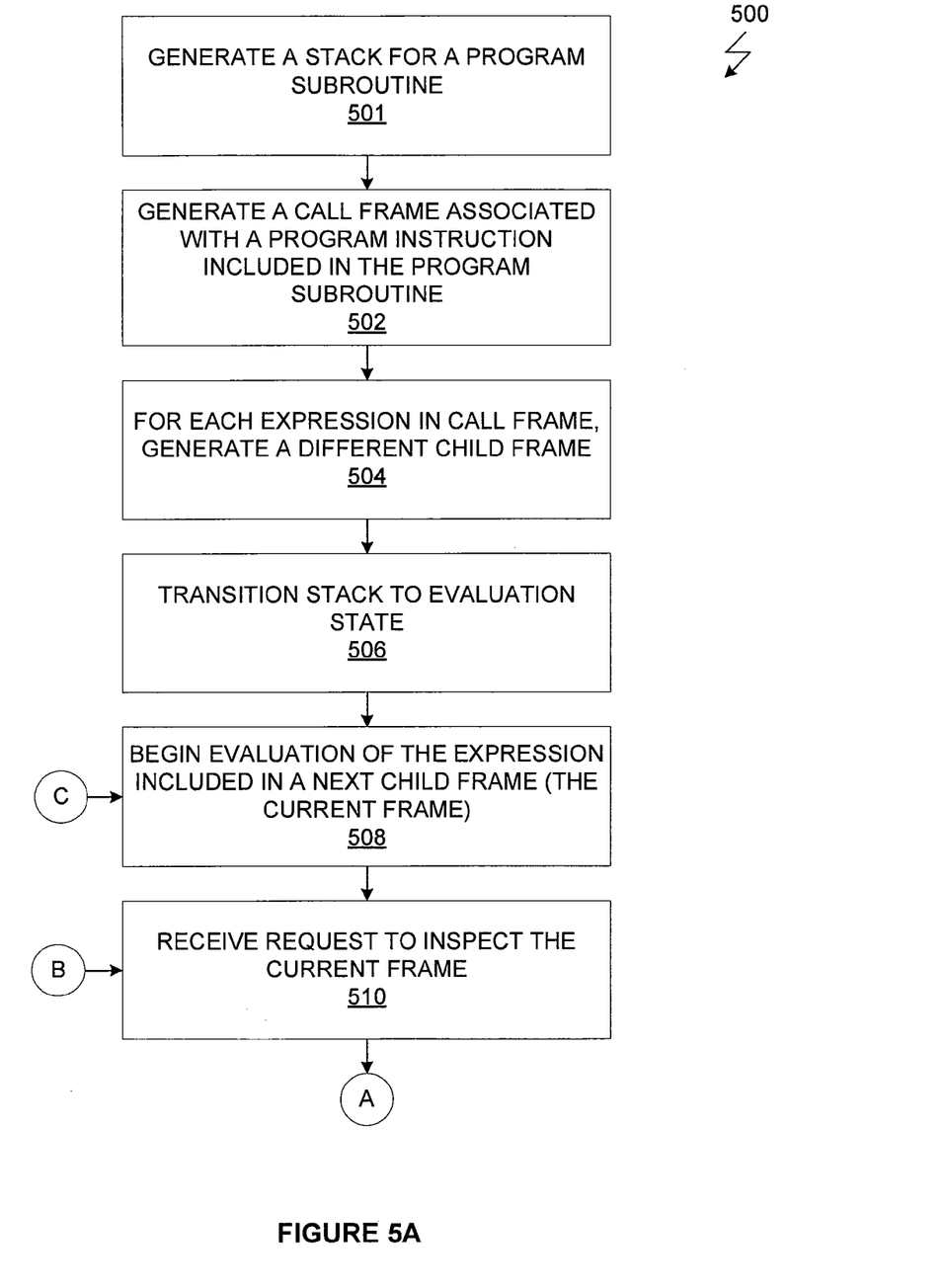
FIGS. 5A and 5B set forth a flow diagram of method steps for evaluating a program instruction within the stack evaluator, according to one embodiment of the invention.
Figure 5B:
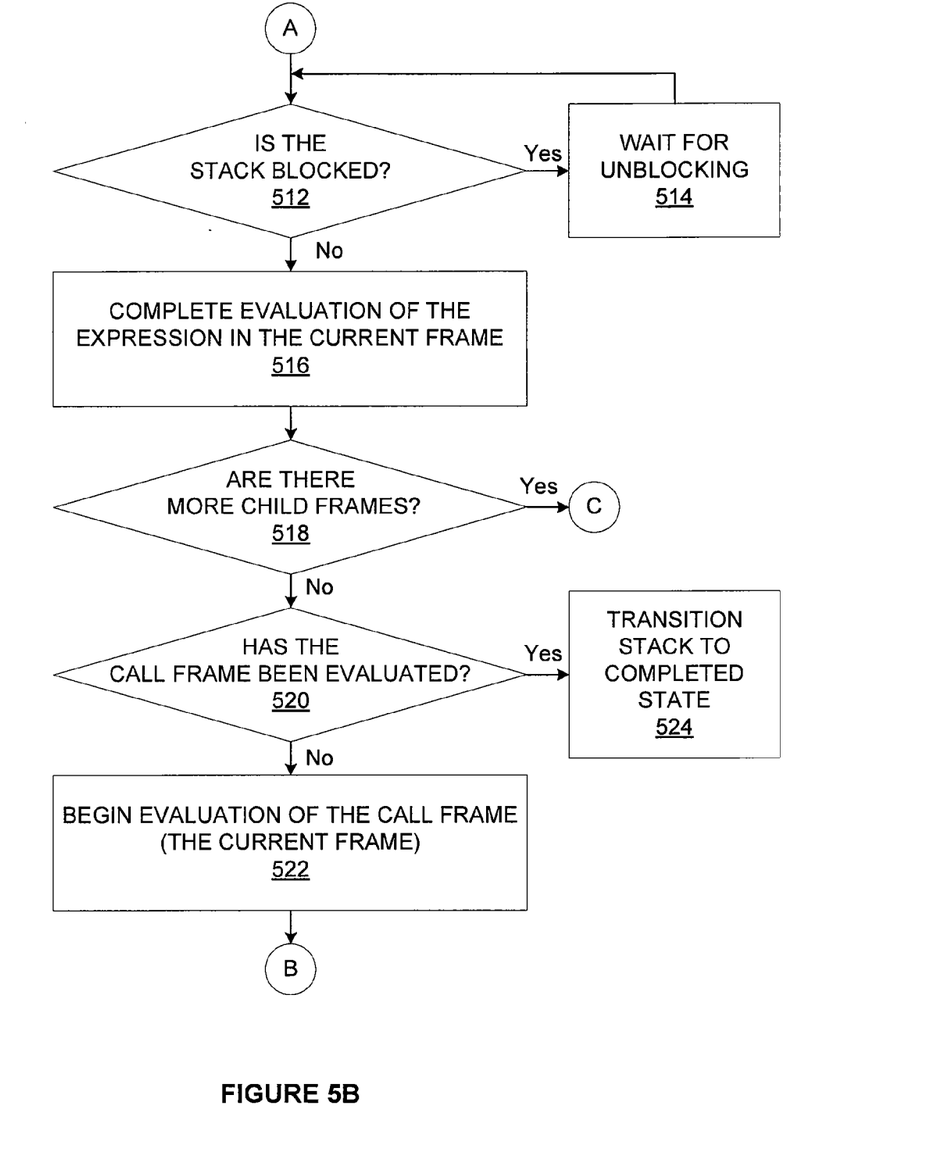

FIGS. 5A and 5B set forth a flow diagram of method steps for evaluating a program instruction within the stack evaluator, according to one embodiment of the invention. Although the method steps are described in conjunction with the system for FIG. 1-4, persons skilled in the art will understand that any system configured to perform the method steps, in any order, is within the scope of the invention.

The method 500 begins at step 501, where the stack evaluator 118 generates a stack 202 corresponding to a program subroutine associated with the application 102 that is being evaluated. At step 502, the stack evaluator 118 generates a call frame associated with a particular program instruction included in the program subroutine. As discussed above, each program instruction within a program subroutine includes one or more expressions to be evaluated. An expression may be an argument, a parameter and/or a metric, as described above. Therefore, the call frame associated with the particular program instruction includes the one or more expressions to be evaluated.

At step 504, the stack evaluator 118 generates a different child frame for evaluating each expression within that instruction. For example, an array frame is generated for each argument of an instruction. At step 506, the stack evaluator 118 transitions the stack 202 to an evaluation state. At step 508, the stack evaluator 118 begins the evaluation of an expression included in a next child frame to be evaluated (referred to herein as the "current frame"). An expression is evaluated either within the stack evaluator 118 itself or needs to be processed within the application server 106 as described above in conjunction with FIG. 1.

At step 510, the stack evaluator 118 receives a request from the inspection engine 302 to inspect the current frame. As described above, each time a new frame is being evaluated, the inspection engine analyzes a current expression that is to be evaluated within the frame to determine whether the evaluation of the expression should be executed in batch with other similar expressions. The process of inspection and batch execution is described in detail with respect to FIGS. 6A and 6B.

At step 512, the stack evaluator 118 determines whether the stack 202 is in a blocked state. As discussed above and described in greater detail with respect to FIGS. 6A and 6B, for a particular stack 202, if the inspection engine 302 determines that the current expression should be evaluated in batch with other similar expressions, then the blocking engine 304 blocks the processing of the current expression and the stack 202, in general. If, at step 512, the stack evaluator 118 determines that the stack 202 is in a blocked state, then the method 500 proceeds to step 514, where the stack evaluator 118 waits until the stack 202 is unblocked by the unblocking engine 306. However, if, at step 512, the stack evaluator 118 determines that the stack 202 is not in a blocked state, then the method 500 proceeds to step 516, where the stack evaluator 118 completes the evaluation of the expression in the current frame.

At step 518, the stack evaluator 118 determines whether any child frames were generated at step 504 are still not evaluated. If so, then the method proceeds to step 508 previously described herein. If the stack evaluator 118 determines that all the child frames were generated at step 504 have been evaluated, then the method 500 proceeds to step 520. At step 520, the stack evaluator 118 determines whether the call frame that was generated at step 502 has been evaluated.

If, at step 520, the stack evaluator 118 determines that the call frame that was generated at step 502 has not been evaluated, then the method 500 proceeds to step 522. At step 522, the stack evaluator 118 begins the evaluation of the call frame based on the expressions that were evaluated via the child frames. The method then proceeds to step 510 previously described herein.

If, however, at step 520, the stack evaluator 118 determines that the call frame that was generated at step 502 has already been evaluated, then the method 500 proceeds to step 524. At step 524, the stack evaluator 118 transitions the state of the stack 202 to the completed state. The method 500 then ends.

As discussed above, the application 102 is associated with one or more program subroutines and each program subroutine includes multiple program instructions. Persons skilled in the art would recognize that the stack evaluator 118 executes the method steps described with respect to FIGS. 5A and 5B for each program instruction included in each program subroutine associated with the application 102, as discussed above.

Figure 6A:
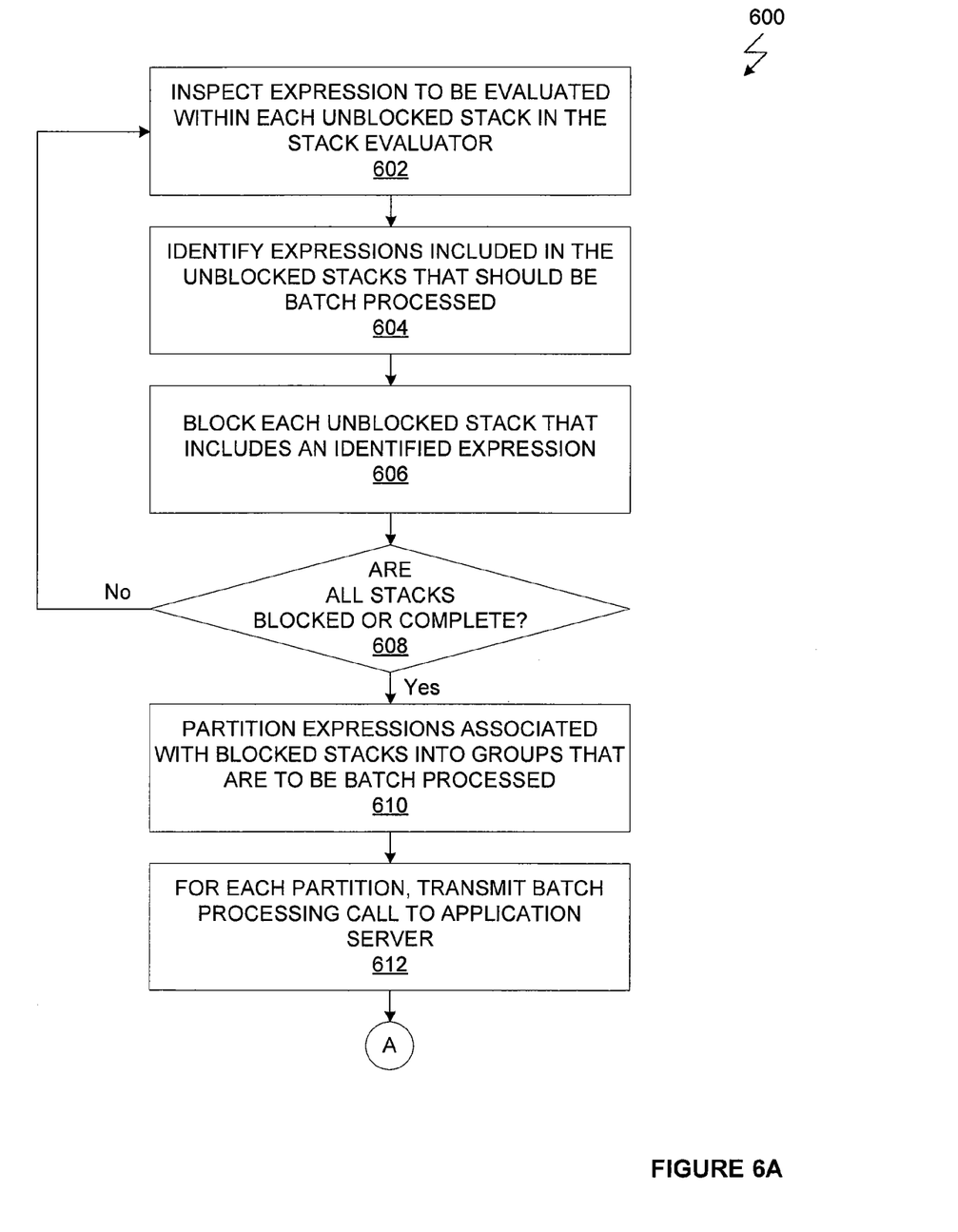
FIGS. 6A and 6B set forth a flow diagram of method steps for processing related program instructions in batches, according to one embodiment of the invention.
Figure 6B:
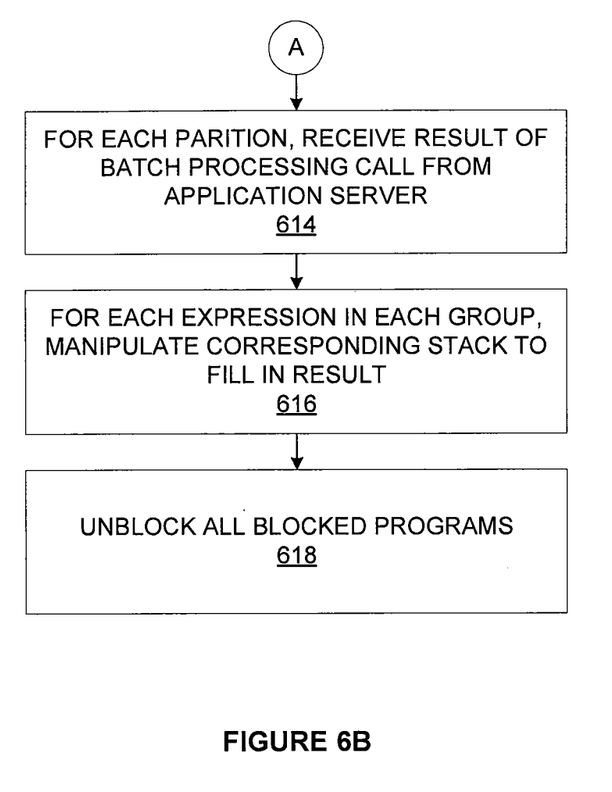

FIGS. 6A and 6B set forth a flow diagram of method steps for processing related program instructions in batches, according to one embodiment of the invention. Although the method steps are described in conjunction with the system for FIG. 1-4, persons skilled in the art will understand that any system configured to perform the method steps, in any order, is within the scope of the invention.

The method 600 begins at step 602, where the inspection engine 302, for each stack 202, inspects an expression within the stack 202 that is to be evaluated. At step 604, the inspection engine 302, based on the inspection, identifies one or more expressions included in the unblocked stacks that should be batch processed. As previously described, the inspections engine 302 identifies such expressions based on a type of the expression, the number of inputs specified in the expression, the type of operation to be performed, etc.

At step 606, the blocking engine 304 blocks the processing of the expressions identified at step 604 and the stacks 202 that include those expressions. In one embodiment, the blocking engine 304 transitions the state of each of the stacks 202 to a blocked state. At step 608, the blocking engine 304 determines whether all the stacks are in a blocked or completed state. If, at step 608, at least one stack is not in a blocked or completed state, then the method 600 returns to step 602. If, however, at step 608, all the stacks are in a blocked or completed state, then the method 600 proceeds to step 610.

At step 610, the blocking engine 304 divides the expressions included in the blocked stacks into partitions, where expressions in a particular partition are each associated with at least one similar characteristic. For example, each blocked expression in a particular partition may be a database call to be executed by the application server 106. At step 612, once the blocked expressions are divided into partitions, the blocking engine 304 dispatches, for each partition, a single call to the application server 106 for evaluating each of the expressions in that partition in batch. The application server 106 evaluates the expression in a manner described above in conjunction with FIG. 1.

At step 614, the unblocking engine 306 receives, for each partition, the results for each expression in the partition. At step 616, for each received result, the unblocking engine 306 updates the stack 202 corresponding to the expression for which the result was generated to store the result. At step 618, the unblocking engine 306 unblocks each of the updated stacks 202, which then continue to be processed.

Advantageously, because a single batch processing request is transmitted to the application server for a group of similar expressions, the number of processing requests received by the application server is reduced. As a result, the application server is not burdened with a large amount of requests at any given time. Therefore, the overall processing efficiency of the application server is increased and the overall processing latency of the application server is reduced.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A computer-implemented method for batch evaluating a program instruction within a stack evaluator, the method comprising:
   generating a call frame associated with the program instruction within a call stack that is associated with a program subroutine which includes the program instruction, wherein the call frame includes one or more expressions specified by the program instruction;
   generating a child frame associated with a first expression of the one or more expressions within the call stack;
   initiating evaluation of the first expression associated with the child frame;
   automatically determining, in response to the initiating, whether the first expression associated with the child frame should be sent for batch processing by an application server based on a particular characteristic in common between the first expression and each of one or more other expressions;
   transitioning the call stack into blocked state, in response to determining that the first expression should be sent for batch processing by the application server;
   sending the first expression and each of the one or more other expressions to the application server;
   in response to the application server processing the first expression associated with the child frame, receiving a modification to the child frame that sets a value of the first expression within the child frame;
   unblocking the call stack; and
   evaluating the call frame based at least in part on the value of the first expression within the child frame.

2. The method of claim 1, further comprising, after generating the child frame associated with the first expression, transitioning the call stack to a stack evaluation state.

3. The method of claim 1, wherein automatically determining whether the first expression associated with the child frame should be sent for processing by the application server comprises:
   determining a first type of expression of the first expression;
   determining whether the first type of expression is an expression from among types of expressions pre-determined to be expressions that should be processed in batch;

when the first type of expression is an expression from among the types of expressions pre-determined to be expressions that should be processed in batch, determining whether the first type of expression of the first expression and a second type of expression of each of the one or more other expressions is the same or similar to each other;

further comprising, when the first type of expression of the first expression and the second type of expression of each of the one or more other expressions are the same or similar to each other, sending the first expression and the one or more other expressions to the application server to be processed in batch by the application server.

4. The method of claim 1, further comprising generating a second call frame associated with the program instruction within the call stack, wherein the second call frame includes a second expression specified by the program instruction, and generating a child frame associated with the second expression within the call stack.

5. The method of claim 4, wherein processing the first expression includes the execution of a database call.

6. The method of claim 1, further comprising receiving a request from a software module to inspect the child frame, wherein the software module applies the modification to the child frame in response to the inspection of the child frame.

7. The method of claim 6, wherein the inspection of the child frame comprises analyzing one or more characteristics associated with the first expression.

8. A non-transitory computer readable medium storing instructions that, when executed by a processor, cause the processor to perform batch evaluating a program instruction within a stack evaluator, by performing the steps of:
generating a call frame associated with the program instruction within a call stack that is associated with a program subroutine that includes the program instruction, wherein the call frame includes one or more expressions specified by the program instruction;
generating a child frame associated with a first expression of the one or more expressions within the call stack;
initiating evaluation of the first expression associated with the child frame;
automatically determining, in response to the initiating, whether the first expression associated with the child frame should be sent for batch processing by an application server based on a particular characteristic in common between the first expression and each of one or more other expressions;
transitioning the call stack into blocked state, in response to determining that the first expression should be sent for batch processing by the application server;
sending the first expression and each of the one or more other expressions to the application server;
in response to the application server processing the first expression associated with the child frame, receiving a modification to the child frame that sets a value of the first expression within the child frame;
unblocking the call stack; and
evaluating the call frame based at least in part on the value of the first expression within the child frame.

9. The computer readable medium of claim 8, further comprising instructions that, when executed by a processor, cause the processor to perform, after generating the child frame associated with the first expression, transitioning the call stack to a stack evaluation state.

10. The computer readable medium of claim 8, wherein the instructions which when executed cause performing automatically determining whether the first expression associated with the child frame should be sent for processing by the application server comprise instructions that, when executed by a processor, cause the processor to perform:
determining a first type of expression of the first expression;
determining whether the first type of expression is an expression from among types of expressions pre-determined to be expressions that should be processed in batch;
when the first type of expression is an expression from among the types of expressions pre-determined to be expressions that should be processed in batch, determining whether the first type of expression of the first expression and a second type of expression of each of the one or more other expressions is the same or similar to each other;
further comprising, when the first type of expression of the first expression and the second type of expression of each of the one or more other expressions are the same or similar to each other, sending the first expression and the one or more other expressions to the application server to be processed in batch by the application server.

11. The computer readable medium of claim 8, further comprising instructions that, when executed by a processor, cause the processor to perform generating a second call frame associated with the program instruction within the call stack, wherein the second call frame includes a second expression specified by the program instruction, and generating a child frame associated with the second expression within the call stack.

12. The computer readable medium of claim 8, further comprising instructions that, when executed by a processor, cause the processor to perform receiving a request from a software module to inspect the child frame, wherein the software module applies the modification to the child frame in response to the inspection of the child frame.

13. The computer readable medium of claim 12, wherein the inspection of the child frame comprises analyzing one or more characteristics associated with the first expression.

* * * * *